United States Patent

Traitler et al.

[11] Patent Number: 6,165,540
[45] Date of Patent: Dec. 26, 2000

[54] PROCESS FOR MANUFACTURING CHOCOLATE COMPOSITIONS CONTAINING WATER

[75] Inventors: Helmut Traitler, Corseaux; Erich J. Windhab, Hemishofen; Bettina Wolf, Zurich, all of Switzerland

[73] Assignee: Nestec S.A., Vevey, Switzerland

[21] Appl. No.: 08/935,427

[22] Filed: Sep. 23, 1997

[30] Foreign Application Priority Data

Sep. 24, 1996 [EP] European Pat. Off. ............. 96202670

[51] Int. Cl.[7] ...................................... A23G 1/00
[52] U.S. Cl. ........................................... 426/631; 426/660
[58] Field of Search ..................... 426/631, 660

[56] References Cited

U.S. PATENT DOCUMENTS

| 4,446,166 | 5/1984 | Giddey | 426/660 |
|---|---|---|---|
| 5,104,680 | 4/1992 | Padley | 426/631 |
| 5,120,566 | 6/1992 | Baba et al. | 426/631 |
| 5,149,560 | 9/1992 | Kealey et al. | 426/602 |
| 5,160,760 | 11/1992 | Takemori et al. | 426/660 |
| 5,244,675 | 9/1993 | Talignani | 426/660 |
| 5,460,847 | 10/1995 | Kawabata | 426/631 |
| 5,468,509 | 11/1995 | Schlup et al. | 426/548 |
| 5,478,588 | 12/1995 | Talignani | 426/660 |
| 5,486,376 | 1/1996 | Alander | 426/660 |
| 5,527,556 | 6/1996 | Frippiat et al. | 426/573 |

FOREIGN PATENT DOCUMENTS

| 0401427 | 12/1990 | European Pat. Off. | 426/631 |
|---|---|---|---|
| 0442324 | 8/1991 | European Pat. Off. | 426/631 |
| 61-56971 | 7/1979 | Japan | 426/631 |
| 54-140773 | 11/1979 | Japan | 426/631 |
| 3-91443 | 4/1991 | Japan | 426/631 |
| 3-228647 | 10/1991 | Japan | 426/631 |
| 4-75556 | 3/1992 | Japan | 426/631 |
| 4-281744 | 10/1992 | Japan | 426/631 |
| 5-284911 | 11/1993 | Japan | 426/631 |
| 6-189682 | 7/1994 | Japan | 426/631 |
| 1538750 | 1/1979 | United Kingdom | A23G 1/00 |

OTHER PUBLICATIONS

Derwent Database Abstract, WPI Accession No. 87/291818/42 XRAM Accession No. C87–123950.

Minifie 1989 Chocolate, Cocoa, and Confectionery: Science & Technology 3rd edition. AVI Publishing New York p. 117–123.

Beckett 1994 Industrial Chocolate Manufacture & Use Blackie Academic & Professional London p. 146–154.

Lowe 1937 Experimental Cookery, 2nd edition John Wiley & Sons Inc. New York p. 266–270.

*Primary Examiner*—Carolyn Paden
*Attorney, Agent, or Firm*—Vogt & O'Donnell, LLP

[57] ABSTRACT

A chocolate composition and water are combined by preparing a water-in-oil emulsion and adding a molten chocolate composition to and mixing it with emulsion so that upon mixing, destruction of the emulsion substantially is avoided and so that the emulsion and chocolate composition are mixed to obtain a chocolate mass in which the water of the emulsion has a form of droplets distributed in a fatty phase of the chocolate mass to obtain a water-droplet-containing chocolate mass product and in which the water may be in an amount of up to 40% by weight.

22 Claims, No Drawings

PROCESS FOR MANUFACTURING CHOCOLATE COMPOSITIONS CONTAINING WATER

BACKGROUND OF THE INVENTION

The present invention relates to preparing chocolate compositions and more particularly to incorporating water into the chocolate compositions during preparation of the compositions.

Chocolate is composed of a fatty phase, cocoa butter and optionally milk fats, containing essentially solid compounds, for example cellulose fibres, sugar crystals and dispersed proteins. In the preparation of chocolate, finely ground or refined cocoa powder is converted into a fluid suspension of sugar, cocoa and optionally milk powder in the fatty phase by the operation of conching. The water content of the chocolate is approximately 1% by weight before conching and less than 1% after this operation which produces evaporation of water. In order to obtain suitable flow properties compatible with the manufacturing stages of chocolate, care is taken to maintain the water content of the chocolate masses below 1% by weight.

There is considerable advantage in the field of confectionery/chocolate-making in increasing the heat resistance of chocolate and reducing its caloric content. Various means, noted below, have been proposed for achieving these results.

One method has consisted of incorporating water or humectants, for example glycerol, directly. When an attempt is made to manufacture chocolate or the like with a high water content (in which the water must be in a dispersed form and wherein the continuous fatty phase contains crystalline when an aqueous phase is incorporated directly, a well known phenomenon, which has yet been elucidated completely is produced in which there is a rapid set of the mass by formation of agglomerates.

According to current knowledge, the origin of the rapid and considerable increase in viscosity would be attributable to an interaction between the hydrophilic surfaces of sugar crystals and pockets of water which would form a sugar-water bonded structure. The consequence of this is that the increase in viscosity induced becomes greater as the sugar crystals dissolve in the pockets of water, which could explain the high viscosity of an emulsified aqueous sugar solution. A chocolate converted in this way is practically impossible to handle and gives a coarse and sandy sensation in the mouth.

Other methods have consisted of adding hydrated substances, foams, syrups, gels or emulsions, either oil-in-water or water-in-oil. An example of such an approach with incorporation of a water-in-oil emulsion is described in U.S. Pat. No. 5,160,760, wherein an emulsion of an aqueous solution of a carbohydrate and a fat in the presence of an emulsifier is prepared, after which the emulsion is mixed with a tempered chocolate mass. The objective aimed at is heat resistance rather than the amount of water incorporated, which is of the order of 1 to 3%.

In another case, U.S. Pat. No. 5,468,509 describes a process for producing milk chocolate containing as much as 16% of water, according to which cocoa is first coated with cocoa butter and lecithin, an aqueous phase is prepared separately by mixing milk powder, sugar and water, and the coated cocoa is then carefully mixed with the aqueous phase and the mixture thus prepared is then tempered.

SUMMARY OF THE INVENTION

The basic problem addressed by the present invention is the provision of a process in which it is possible to incorporate as much as 40% by weight of water in a conventional matrix of chocolate and the like without significant modification of its rheological behaviour, apart from a reduction in viscosity and hence without any modification to the production parameters associated, for example, to moulding, enrobing and filling.

The invention thus concerns a process for preparing compositions co chocolate and the like characterized in that a mass of chocolate or the like is carefully mixed into an emulsified water-in-oil base, so that destruction of the water-in-oil structure of the emulsion is substantially avoided as well as contact between the sweetened components and the non-fatty solids of cocoa on the one hand and the dispersed aqueous phase (which is responsible for the formation of agglomerates and in ability of the chocolate to be converted by the classical manufacturing process if maintained).

DETAILED DESCRIPTION OF THE INVENTION

In the context of the terminology employed herein and in the claims below, the term "chocolate composition" is employed to embrace the terms "chocolate" and "like chocolate" and its analogs. Within the context of the invention, "like chocolate" means a confectionery mass of which the composition is similar to that of chocolate, i.e. containing fatty matter constituting the continuous phase and sugar dispersed in this fatty phase. Thus, all or part of the cocoa butter may be replaced by a fat of vegetable origin or a mixture of fats of vegetable origin currently used in confectionery of which the physico-chemical properties are similar to or equivalent to those of cocoa butter. With the same idea in mind, the non-fatty solids of cocoa may be totally or partially replaced by constituents normally used in chocolate confectionery. Finally, sucrose may be replaced partly or completely by a substitute such as, preferably, a low-calorie sweetening agent.

The aqueous phase of the water-in-oil emulsion may contain a polyol, for example glycerol, if it is desired to improve the microbiological stability of the chocolate. It may advantageously contain water-soluble substances for example flavourings, preservatives, active substances, trace elements and/or vitamins.

In order to implement the process, a first step consists of reparing an emulsified base, or a pre-emulsion of water-in-oil, for example in the case of chocolate based on cocoa butter as the continuous fatty phase, at approximately 45° C. with stirring in the presence of an emulsifier. The water content of such a pre-emulsion may be 10–80% by weight and preferably 40–70% by weight. In order to do this, the ingredients may be mixed in a thermostatically controlled vessel with the aid of a stirrer, for example a stirrer in the form of an anchor, or of an anchor with a coaxial blade or with a helix, having a medium speed of rotation. The aqueous medium is preferably introduced hot, for example at approximately 70° C., in small quantities.

As an emulsifier, use may preferably be made of a lecithin, a polyglycerol ester of a fatty acid or a mixture of such emulsifiers in a quantity of 0.5 to 3% by weight, preferably approximately 1% by weight. Optionally, preservative salts may be added to the aqueous medium to ensure microbiological stability, for example, sodium benzoate and potassium sorbate. Other water soluble compounds may also be added. It is possible to use, for example, a cream or a sweetened or unsweetened concentrated milk as the composition containing water, i.e. as a source of water.

By incorporating water, it is possible to prepare functional chocolates with a nutritional value, for example by incorporating calcium, for example in the form of calcium lactate and vitamin C.

The second stage of the process consists of creating a fine to medium emulsion, for example with a colloid mill with a crenellated disc rapidly rotating, for example with a speed of rotation of about 8000 rpm, with a narrow dispersion gap, for example of the order of 0.5 mm. The droplets within this emulsion are micro-droplets and should have a mean diameter less than or equal to approximately 2 microns and the emulsion must not separate within the time necessary for its subsequent treatment, i.e. it must be stable preferably for about 1 hour.

In a third stage, a fatty mass, for example molten chocolate held at approximately 45° C., is carefully incorporated in small quantities into all this water-in-oil emulsion using slight to moderate stirring. The stabilized water-in-oil emulsion of the base may be mixed with the mass of chocolate or the like in a proportion by weight of the emulsified base-:mass of chocolate or the like of 1:20 to 2:1.

It is possible to carry out the process in batches. In order to do this, it is possible to use, for example, a stirrer with a helical strip or with an anchor associated, optionally, with a complementary component with a coaxial blade. This incorporation does not induce any appreciable thickening of the mixture, if the mechanical work is carried out carefully and if the water droplets are small and well stabilized. In the case of chocolate, this may be dark chocolate, milk chocolate or even white chocolate, i.e. the mass does not contain non-fatty cocoa solids.

According to an alternative, the mass of chocolate or the like may be incorporated in the water-in-oil emulsion continuously by means of one or more static mixers arranged in series.

In a fourth stage, the chocolate is then crystallized under conditions of slight turbulence, for example by means of a crystallizer with a scraped surface having wide interstices, in a conventional manner while controlling the temperature to temper it. Crystallization takes longer however than does that normally carried out, on account of the tendency of the mixture to crystallize more slowly than a conventional chocolate.

The final product has a water content of 1 to 40% by weight.

The chocolate obtained is economical, low in calories, has a neutral flavour and is heat-resistant. It can serve as a vehicle for nutritional compounds or for biologically active substances. It can be moulded or used as a filling or a centre or as an enrobing composition.

According to an advantageous embodiment, the chocolate is subjected to thermal conditioning in a subsequent step and partial or total dissolution of the crystallized sugar in the water droplets is obtained in this way while maintaining the structure of the water-in-oil emulsion intact.

Thermal conditioning of the chocolate or the like may take place after tempering/filling/pouring of the mass into moulds, by keeping it at a temperature of 25 to 30° C. for 1 hour to 1 week.

EXAMPLES

The following examples, in which percentages and parts are by weight unless stated to the contrary, illustrate the invention.

EXAMPLES 1–6

A pre-emulsion was prepared in a thermostatically controlled vessel fitted with an anchor stirrer by mixing 200 g of molten cocoa butter containing emulsifier at 45° C. with water using a stirrer rotating at 280 rpm for a period of 20 min, until the emulsion contained 40% water.

The emulsion was then treated for 1 min in a POLYTRON colloid mill with a crenellated disc, the rotor of which revolved at 8000 rpm. 657 g of molten dark chocolate, having 26.1% fatty matter (emulsion/chocolate ratio=0.37), were then added progressively to 243 g of the fine emulsion produced, with stirring, using a mixer in the form of an anchor revolving at 250 rpm for a period of 3 min.

The mixture was then tempered for 1 min at 26.5° C., and then for 3 min at 31° C. and was then poured into moulds at 31° C.

According to an alternative, a non-tempered mixture was used which was poured into moulds at 41° C.

After holding the product for 15 min at 12° C., it was kept at 18° C. A fat bloom test was carried out on the product with a temperature cycle of 31° C.–21° C.–31° C.–21° C. for 6 h at each temperature.

The chocolate obtained had 10% water and 36% fatty matter. The ingredients (apart from water) used in the pre-emulsion, together with their proportions, are given in table 1 below.

TABLE 1

| Example | 1 | 2 | 3 | 4 | 5 | 6 |
| --- | --- | --- | --- | --- | --- | --- |
| Pre-emulsion Emulsifier (%) | | | | | | |
| a | 0.5 | 1 | 0.5 | 1 | 0.5 | 0.5 |
| b | 0.5 | — | — | — | — | — |
| c | — | — | 0.5 | 2 | — | — |
| d | — | — | — | — | 0.1 | — |
| e | — | — | — | — | — | 0.2 |
| cocoa butter (%) | 59 | 59 | 59 | 57 | 59.4 | 59.3 |
| water (%) | 40 | 40 | 40 | 40 | 40 | 40 |

Legend
  a: Inter-esterified polyglycerol ester of ricinoleic acid
  b: Soya lecithin and ammonium phosphatide
  c: Refined soya lecithin and polyglycerol ricinoleate
  d: Defatted soya lecithin fraction
  e: Pure defatted granulated soya lecithin Table 2 below gives the results of laser scan measurements of the size and size distribution of water droplets within the pre-emulsion, for a chocolate without incorporated water (the fatty matter content of which has been brought to the same value as that of the chocolate according to the invention by adding cocoa butter) and for a chocolate according to the invention.

TABLE 2

| Size of water droplets (micron) | Water-in-oil Emulsion | Chocolate without incorporation of water | Chocolate according to the invention |
| --- | --- | --- | --- |
| $X_{10.0}$ | 1.07 | 2.61 | 3.9 |
| $X_{50.0}$ | 1.90 | 8.70 | 13.5 |
| $X_{90.0}$ | 3.55 | 56.7 | 84.2 |

Legend:
  $X_{n.0}$ signifies that n of all the droplets had a diameter < or =X in micron.

The results show that the water droplets in the emulsion had a narrow size distribution (from 0.5 to 5 micron) with a mean value of 1.4 micron. They also show a slight increase in diameters compared with the chocolate without water incorporated. This slight increase indicates a tendency for water to be attached to the surface of the sugar, but this phenomenon is only involved to a slight extent and in a proportion which does not affect the rheological behaviour of the chocolate.

Table 3 below shows a comparison of the flow properties (shear stress as a function of shear rate) of the original chocolate and of the chocolate with water incorporated according to the invention, at 40° C.

TABLE 3

| Shear rate (1/s) | Shear stress of the chocolate without water incorporated (Pa) | Shear stress of the chocolate with water incorporated (Pa) |
| --- | --- | --- |
| 5 | 22 | 30.5 |
| 10 | 30 | 33.2 |
| 50 | 70.5 | 68 |
| 100 | 112 | 103 |

It will be observed that the behaviour is virtually identical in the medium to high shear rate range, although the chocolate with water incorporated according to the invention shows an upward shift in shear stress with low shear rates. This can be explained by a slight increase in the interaction between water droplets and sugar crystals in a highly dispersed medium. This is not comparable to the strong water-sugar interaction due to large size water droplets which would lead to a 10 or 20 times increase in shear stress compared with the chocolate without water incorporated.

EXAMPLE 7

A pre-emulsion was prepared in a thermostatically controlled vessel fitted with an anchor stirrer by mixing 200 g of molten cocoa butter containing 3% of an inter-esterified polyglycerol ester of ricinoleic acid as emulsifier at 45° C. with 300 g of water using a stirrer rotating at 280 rpm for a period of 20 min, until the emulsion contained 60% of water.

The emulsion was then treated for 1 min in a POLYTRON colloid mill with a crenellated disc, the rotor of which revolved at a speed of 8000 rpm. 400 g of molten milk chocolate containing maltitol as a replacement for sucrose, having 26.1% fatty matter (emulsion/chocolate ratio=0.5), were then added progressively to 200 g of the fine emulsion produced, with stirring, using a mixer in the form of an anchor revolving at 250 rpm for a period of 3 min.

After inoculation with 0.5% of tempered grated dark chocolate, the mixture was left for 5 min at 31° C. and was poured into moulds at this temperature.

In the preceding examples, the incorporation of water has been shown into dark chocolate and milk chocolate. The same incorporation of water is possible in the form of a water-in-oil emulsion into white chocolate or in any fatty mass containing dispersed sugar. Accordingly, the invention is applicable to the manufacture of moulded masses, enrobed masses or masses for fillings.

In all cases, the masses with water incorporated according to the invention have a rheological behaviour which enables them to be processed without modification to the parameters in conventional production operations for confectionery/chocolate making. The organoleptic qualities of the chocolates and masses are maintained and there is no fat bloom appearance.

What is claimed is:

1. A process for combining a chocolate composition and water to obtain a water-containing chocolate mass product comprising preparing a water-in-oil emulsion and adding a molten chocolate composition into the emulsion and mixing the added molten chocolate composition and the emulsion so that destruction of the emulsion substantially is avoided and so that during the adding and mixing, the molten chocolate composition is added and the added molten chocolate composition and emulsion are mixed to obtain chocolate mass product which comprises a fatty phase and contains water in a form of droplets distributed in the fatty phase and which contains the water in an amount of from 1% to 40% by weight.

2. A process according to claim 1 wherein the water-in-oil emulsion is prepared so that the droplets of the emulsion have a size equal to or less than 2 microns.

3. A process according to claim 2 wherein the water-in-oil emulsion comprises water in an amount of from 10% to 80% by weight based upon emulsion weight and wherein the chocolate is added to and mixed with the emulsion in a weight proportion of chocolate composition to emulsion of from 20:1 to 1:2.

4. A process according to claim 3 wherein the water-in-oil emulsion comprises the water in an amount of from 40% to 70% by weight.

5. A process according to claim 1 wherein the water-in-oil emulsion comprises water in an amount of from 10% to 80% by weight based upon emulsion weight.

6. A process according to claim 5 wherein the water is in an amount of from 40% to 70%.

7. A process according to claim 5 or 6 wherein the chocolate composition is added to and mixed with the emulsion in a weight proportion of chocolate composition to emulsion of from 20:1 to 1:2.

8. A process according to claim 1 wherein the water-in-oil emulsion is prepared so that it comprises an emulsifier in an amount of 0.5% to 3% by weight based upon emulsion weight.

9. A process according to claim 1 wherein the emulsifier is selected from the group consisting of lecithin and a polyglycerol ester of a fatty acid.

10. A process according to claim 1 wherein the water-in-oil emulsion is prepared so that it comprises a polyol.

11. A process according to claim 1 wherein the water-in-oil emulsion is prepared so that it comprises a water-soluble substance selected from the group consisting of water-soluble flavoring substances, preservatives, vitamins, minerals and trace elements.

12. A process according to claim 1 further comprising controlling a temperature of the water-droplet-containing-chocolate mass product obtained to temper the mass to obtained a tempered mass.

13. A process according to claim 12 wherein the temperature of the water-droplet-containing-chocolate mass product is controlled by treating the mass product in a crystallyzer having a scraped surface.

14. A process according to claim 12 further comprising conditioning the tempered mass thermally for a period for dissolving sugar crystallized in the water droplets.

15. A process according to claim 12 further comprising pouring the tempered mass into a mold and conditioning the mass in the mold thermally for dissolving sugar crystallized in the water droplets.

16. A process according to claim 1 further comprising conditioning the water-droplet-containing-chocolate mass product thermally for a period for dissolving sugar ystallized in the water droplets.

17. A process according to claim 16 or 14 or 15 wherein the mass is conditioned at a temperature of from 25° C. to 30° C.

18. A process according to claim 1 wherein the chocolate composition and emulsion are mixed by stirring with a stirrer which comprises a helical strip.

19. A process according to claim 1 wherein the chocolate composition and emulsion are mixed by passing the composition and emulsion through a static mixer.

20. A process according to claim 1 wherein the chocolate composition comprises a fat which is equivalent in physiochemical properties to cocoa butter.

21. A process according to claim 1 wherein the chocolate composition is a chocolate analog.

22. A process according to claim 1 wherein the emulsion is prepared and the molten chocolate is added to and mixed with the emulsion so that the water-droplet-containing-chocolate mass product contains the water in an amount of from 10% to 40% by weight.

* * * * *